United States Patent [19]

Lassota

[11] Patent Number: 4,553,912

[45] Date of Patent: Nov. 19, 1985

[54] CYLINDER-PISTON OF A ROTARY COMPRESSOR

[76] Inventor: Marek J. Lassota, 8657 W. Foster Ave., Chicago, Ill. 60656

[21] Appl. No.: 580,102

[22] Filed: Nov. 19, 1985

Related U.S. Application Data

[63] Continuation-in-part of Ser. No. 318,876, Nov. 6, 1981, Pat. No. 4,431,387, which is a continuation-in-part of Ser. No. 93,599, Nov. 13, 1979, abandoned, which is a continuation-in-part of Ser. No. 821,729, Aug. 4, 1977, Pat. No. 4,174,195, which is a continuation-in-part of Ser. No. 692,199, Jun. 2, 1976, abandoned, which is a continuation-in-part of Ser. No. 659,430, Feb. 19, 1976, abandoned.

[51] Int. Cl.[4] .......................... F01C 1/26; F01C 21/08; F16J 1/24

[52] U.S. Cl. ....................................... 418/54; 418/58; 418/151; 92/177

[58] Field of Search ..................... 418/54, 58, 60, 151; 91/196; 92/177; 417/460, 462–466; 123/42, 51 B; 29/156.4 R

[56] References Cited

U.S. PATENT DOCUMENTS

| | | | |
|---|---|---|---|
| 39,957 | 9/1863 | Root | 92/177 |
| 3,873,245 | 3/1975 | Doshi | 418/54 |

*Primary Examiner*—John J. Vrablik
*Attorney, Agent, or Firm*—Thomas W. Speckman

[57] ABSTRACT

An unsymmetrical cylinder-piston of a rotary compressor having a body with a bearing for receipt of a rotatable cylinder-piston shaft therein; two spaced walls extending from the body and having opposing parallel surfaces; a wall interconnecting the two spaced walls at their end remote from the body to form an opening in the cylinder-piston for receipt of a rectangular piston in slidable relation therein, the spaced walls being bolted to the body and connecting wall and the body being balanced making the center of gravity of the unsymmetrical cylinder piston on or close to the axis of the bearing located therein.

1 Claim, 1 Drawing Figure

CYLINDER-PISTON OF A ROTARY COMPRESSOR

CROSS REFERENCE TO RELATED APPLICATIONS

This application is a continuation-in-part of my co-pending application, Ser. No. 318,876, filed Nov. 6, 1981, to issue as U.S. Pat. No. 4,431,387 on Feb. 14, 1984, which is a continuation-in-part of my prior application, Ser. No. 93,599, filed Nov. 13, 1979, now abandoned, which is a continuation-in-part of my prior application, Ser. No. 821,729, filed Aug. 4, 1977, and issued as U.S. Pat. No. 4,174,195 on Nov. 13, 1979, which is a continuation-in-part of my prior application, Ser. No. 692,199, filed June 2, 1976, now abandoned, which is a continuation-in-part of my prior application, Ser. No. 659,430, filed Feb. 19, 1976, now abandoned.

BACKGROUND OF THE INVENTION

This invention relates in general to a rotary compressor, and more particularly to a cylinder-piston of such rotary compressor.

Reciprocating piston compressors are well known in the art. They possess, however, inherent disadvantages of having reciprocating motion of a piston causing high stresses in certain components, vibration, noise, and limiting their rotational speeds. Due to speed limitations reciprocating compressors are also relatively bulky and heavy machines.

Various types of rotary compressors have been proposed to replace the reciprocating piston compressor in order to overcome some of its disadvantages, and to realize new advantages. One approach which has been taken is to develop new types of rotary compressors such as those described in more detail in my issued U.S. Pat. Nos. 4,137,022 and 4,174,195, and in my co-pending application Ser. No. 318,876, filed Nov. 6, 1981, to issue as U.S. Pat. No. 4,431,378 on Feb. 14, 1984.

The cylinder-piston described and claimed in this application is the single most important component of the rotary compressors of my invention.

SUMMARY OF THE INVENTION

The rotary compressors of my invention are more fully described in my issued U.S. Pat. Nos. 4,137,022 and 4,174,195, and in my allowed patent application to isssue as U.S. Pat. No. 4,431,378, disclosures of which are incorporated herein in full by reference. In all those Patents, the term "cylinder-piston" refers to an element operating as both a cylinder and a piston, although the configuration of this element is not at all geometrically cylindrical.

The cylinder-piston of this invention comprises generally a body and two spaced, parallel walls extending from the body and connected at their ends remote from the body by a connecting wall. The parallel walls are bolted to the body and to connecting wall to form the cylinder-piston.

OBJECTS OF THE INVENTION

One object of the present invention is to provide a cylinder-piston which is simple and inexpensive in production.

Another object of the present invention is to provide a cylinder-piston which is compact and lightweight.

These and other objects of the present invention will become apparent when reading the annexed detailed description in view of the attached drawing.

DESCRIPTION OF THE PREFERRED EMBODIMENT

Figure 1:
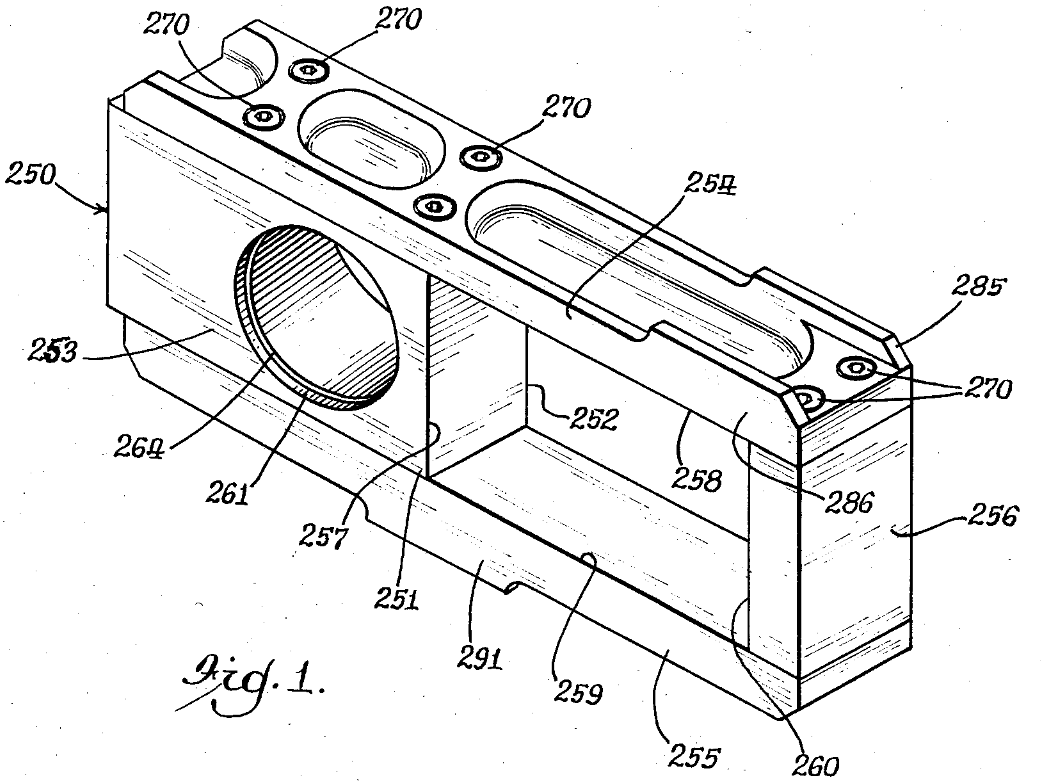
FIG. 1 is a perspective view of the assembled cylinder-piston element.

The rotary compressor using the cylinder-piston element of this invention is more fully described in my issued U.S. Pat. Nos. 4,137,022 and 4,174,195, and in my allowed patent application to issue as U.S. Pat. No. 4,431,378 on Feb. 14, 1984, disclosures of which are incorporated herein in entirety by reference.

Referring first to FIG. 1, the cylinder-piston according to one embodiment of the invention is indicated generally by numeral 250. Cylinder-piston 250 comprises body 253 and spaced walls 254 and 255 extending from body 253 and connected at their ends remote from body 253 by connecting wall 256.

Spaced walls 254 and 255 are bolted to body 253 and connecting wall 256 by suitable bolts or screws 270.

Spaced walls 254 and 255 have opposing parallel surfaces 258 and 259; body 253 has surface 257 and connecting wall has surface 260. Surfaces 257, 258, 259 and 260 define an opening in cylinder-piston 250 in which a piston operates. Surfaces 258, 259 and 257 form three of four movable surfaces of one compression chamber, and surfaces 258, 259 and 260 form three of four movable surfaces of second compression chamber.

Bearing 264 is located in housing 261 of body 253. The portion of body 253, remote from spaced walls 254 and 255 is sufficiently large to act as a balancing means to balance cylinder-piston 250 by making a center of gravity of cylinder-piston 250 located on or close to the axis of its bearing 264. Balancing weight inserts or voids may also be used in this portion of body 253 to obtain good balance, particularly when the cylinder-piston is constructed of lightweight material.

I claim:

1. An unsymmetrical cylinder-piston of a rotary compressor comprising:

a body having bearing means for receipt of a rotatable cylinder-piston shaft therein, two spaced walls extending from said body and having opposing parallel surfaces, a wall interconnecting said two spaced walls at their ends remote from said body to form an opening in said cylinder-piston for receipt of a rectangular piston in slidable relation therein, said spaced walls bolted to said body and said connecting wall, and said body having balancing means capable of making a center of gravity of said unsymmetrical cylinder-piston on or close to the axis of said bearing means.

* * * * *

UNITED STATES PATENT AND TRADEMARK OFFICE

CERTIFICATE OF CORRECTION

PATENT NO. : 4,553,912

DATED : Nov. 19, 1985

INVENTOR(S) : Marek J. Lassota

It is certified that error appears in the above—identified patent and that said Letters Patent is hereby corrected as shown below:

In the heading of the patent, line [22] Filed: delete "Nov. 19, 1985", and in its place insert --Feb. 14, 1984--

Signed and Sealed this

*Twenty-eighth* Day of *January 1986*

[SEAL]

*Attest:*

DONALD J. QUIGG

*Attesting Officer* *Commissioner of Patents and Trademarks*